US008868733B2

(12) United States Patent
Livet et al.

(10) Patent No.: US 8,868,733 B2
(45) Date of Patent: Oct. 21, 2014

(54) SOCKET APPLICATION PROGRAM INTERFACE (API) EXTENSION

(75) Inventors: Catherine Livet, Montreal (CA); Michelle Perras, Montreal (CA); Juan Carlos Zuniga, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 254 days.

(21) Appl. No.: 13/274,134

(22) Filed: Oct. 14, 2011

(65) Prior Publication Data

US 2012/0271938 A1  Oct. 25, 2012

Related U.S. Application Data

(60) Provisional application No. 61/393,561, filed on Oct. 15, 2010.

(51) Int. Cl.
| | | |
|---|---|---|
| G06F 15/173 | (2006.01) | |
| H04W 60/00 | (2009.01) | |
| H04L 29/06 | (2006.01) | |
| H04W 88/06 | (2009.01) | |
| H04W 80/06 | (2009.01) | |

(52) U.S. Cl.
CPC .......... *H04W 60/005* (2013.01); *H04L 69/161* (2013.01); *H04W 88/06* (2013.01); *H04W 80/06* (2013.01); *H04L 69/14* (2013.01)
USPC ........................... 709/224; 709/227; 709/230

(58) Field of Classification Search
USPC ................................. 709/224, 227, 230, 223
See application file for complete search history.

(56) References Cited

U.S. PATENT DOCUMENTS

| | | | | |
|---|---|---|---|---|
| 4,407,016 | A | * | 9/1983 | Bayliss et al. ..................... 710/3 |
| 6,115,393 | A | * | 9/2000 | Engel et al. .................. 370/469 |
| 6,957,276 | B1 | * | 10/2005 | Bahl ............................. 709/245 |
| 2004/0243703 | A1 | * | 12/2004 | Demmer et al. .............. 709/224 |
| 2012/0243441 | A1 | * | 9/2012 | Reunamaki et al. .......... 370/255 |
| 2012/0257633 | A1 | * | 10/2012 | Gupta et al. .................. 370/401 |
| 2012/0271938 | A1 | * | 10/2012 | Livet et al. ................... 709/224 |
| 2013/0194963 | A1 | * | 8/2013 | Hampel ....................... 370/254 |

OTHER PUBLICATIONS

Ford et al., "TCP Extensions for Multipath Operation with Multiple Addresses draft-ford-mptcp-multiaddressed-03", Internet Engineering Task Force, Internet-Draft, Mar. 8, 2010, 1-36.

Hampel et al., "Enhancements to Improve the Applicability of Multipath TCP to Wireless Access Networks draft-hampel-mptcp-applicability-wireless-networks-00", Internet Engineering Task Force (IETF), Internet-Draft, Jun. 15, 2011, 1-25.

Scharf et al., "MPTCP Application Interface Considerations; draft-scharf-mptcp-api-02", Internet Engineering Task Force (IETF), Internet-Draft, Jul. 9, 2010, 1-24.

(Continued)

*Primary Examiner* — Michael Y Won
(74) *Attorney, Agent, or Firm* — Condo Roccia Koptiw LLP

(57) ABSTRACT

Embodiments contemplate one or more socket application program interface (API) extensions that may provide one or more Internet Protocol Address lists. Embodiments may include determining a state (or status) of one or more available Internet Protocol (IP) addresses. Further, embodiments may include communicating the state (or status) of the available Internet addresses to a Multi Connection Transport Protocol.

18 Claims, 12 Drawing Sheets

(56) References Cited

OTHER PUBLICATIONS

Scharf, M. "Multi-Connection TCP (MCTCP) Transport; draft-scharf-mptcp-mctcp-01", Internet Engineering Task Force (IETF), Jul. 12, 2010, 1-35.

Ford et al., "Architectural Guidelines for Multipath TCP Development", MPTCP Architecture, Internet-Draft, Feb. 28, 2010, pp. 1-24.

M. Scharf et al., "MPTCP Application Interface Considerations", MPTCP API, Internet-Draft, Mar. 8, 2010, pp. 1-20.

R. Braden, "Requirements for Internet Hosts—Communication Layers", Internet Engineering Task Force, RFC1122, Oct. 1989, pp. 1-116.

M. Blanchet et al., "Multiple Interfaces Problem Statement", Internet Engineering Task Force, Aug. 14, 2010, pp. 1-15.

Liu et al., "Socket API Extension for Multiple Connection Support", MIF API Extension, Internet-Draft, Jul. 10, 2010, pp. 1-10.

P. Seite, "Connection Manager requirements", Connection Manager Requirements, Jul. 26, 2010, pp. 1-16.

\* cited by examiner

SOCKET APPLICATION PROGRAM INTERFACE (API) EXTENSION

CROSS REFERENCE TO RELATED APPLICATIONS

This application claims the benefit of U.S. Provisional Patent Application No. 61/393,561 titled "SOCKET APPLICATION PROGRAM INTERFACE (API) EXTENSION FOR PROVIDING AN INTERNET PROTOCOL ADDRESSES LIST", filed on Oct. 15, 2010, the content of which being hereby incorporated by reference herein, for all purposes.

BACKGROUND

Host devices may have the ability to attach to multiple networks simultaneously. This can happen over multiple physical network interfaces, a combination of physical and virtual interfaces (Virtual Private Networks (VPNs) or tunnels), or even indirectly through multiple default routers being on the same link. For example, laptops, smartphones, and various other computing devices may have multiple access network interfaces.

A host device that may be attached to one or more networks via one or more virtual and/or physical interfaces may be referred to as a Multihomed Host (MH). An MH can receive various IP addresses from each of its access networks.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Embodiments contemplate one or more socket application program interface (API) extensions that may provide Internet Protocol Addresses list. One or more embodiments may include determining a current state of available Internet Protocol (IP) addresses. Further, embodiments may include communicating the current state of the available Internet addresses to a Multi Connection Transport Protocol (MCTP).

Embodiments contemplate monitoring a Multi Connection Transport Protocol (MPTCP) connection between a first device and a second device. Embodiments contemplate that the first device and the second device may have a respective MPTCP layer. Embodiments also contemplate that the first device may be associated with one or more Internet Protocol (IP) addresses. Embodiments contemplate determining a state of at least one of the one or more first device IP addresses. Embodiments further contemplate communicating the state of the at least one of the one or more first device IP addresses and the at least one of the one or more first device IP addresses to the second device via the MPTCP connection.

Embodiments contemplate monitoring a Multi Connection Transport Protocol (MPTCP) connection between a first device and a second device. Embodiments contemplate that the first device and the second device may have a respective MPTCP layer. Embodiments also contemplate that the first device may be associated with one or more Internet Protocol (IP) addresses. Embodiments further contemplate determining a state of at least one of the one or more first device IP addresses. Embodiments further contemplate adding one or more parameters respectively to the at least one of the one or more first device IP addresses. Also, embodiments contemplate communicating the state of the at least one of the one or more first device IP addresses and the added-to at least one of the one or more first device IP addresses to the second device via the MPTCP connection.

Embodiments contemplate a wireless transmit/receive unit (WTRU) configured to communicate internet protocol (IP) information. The WTRU may include a processor, and the processor may be configured, at least in part, to monitor a Multi Connection Transport Protocol (MPTCP) connection between the WTRU and a second device. Embodiments contemplate that the WTRU and the second device may have a respective MPTCP layer, and the WTRU may be associated with one or more Internet Protocol (IP) addresses. Embodiments contemplate that the processor may be further configured to determine a state of at least one of the one or more WTRU IP addresses. Embodiments also contemplate that the processor may be further configured to initiate the communication of the state of the at least one of the one or more WTRU IP addresses and the at least one of the one or more first device IP addresses to the second device via the MPTCP connection.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. As used herein, the article "a", absent further qualification or characterization, may be understood to mean "one or more" or "at least one", for example.

Figure 1A:
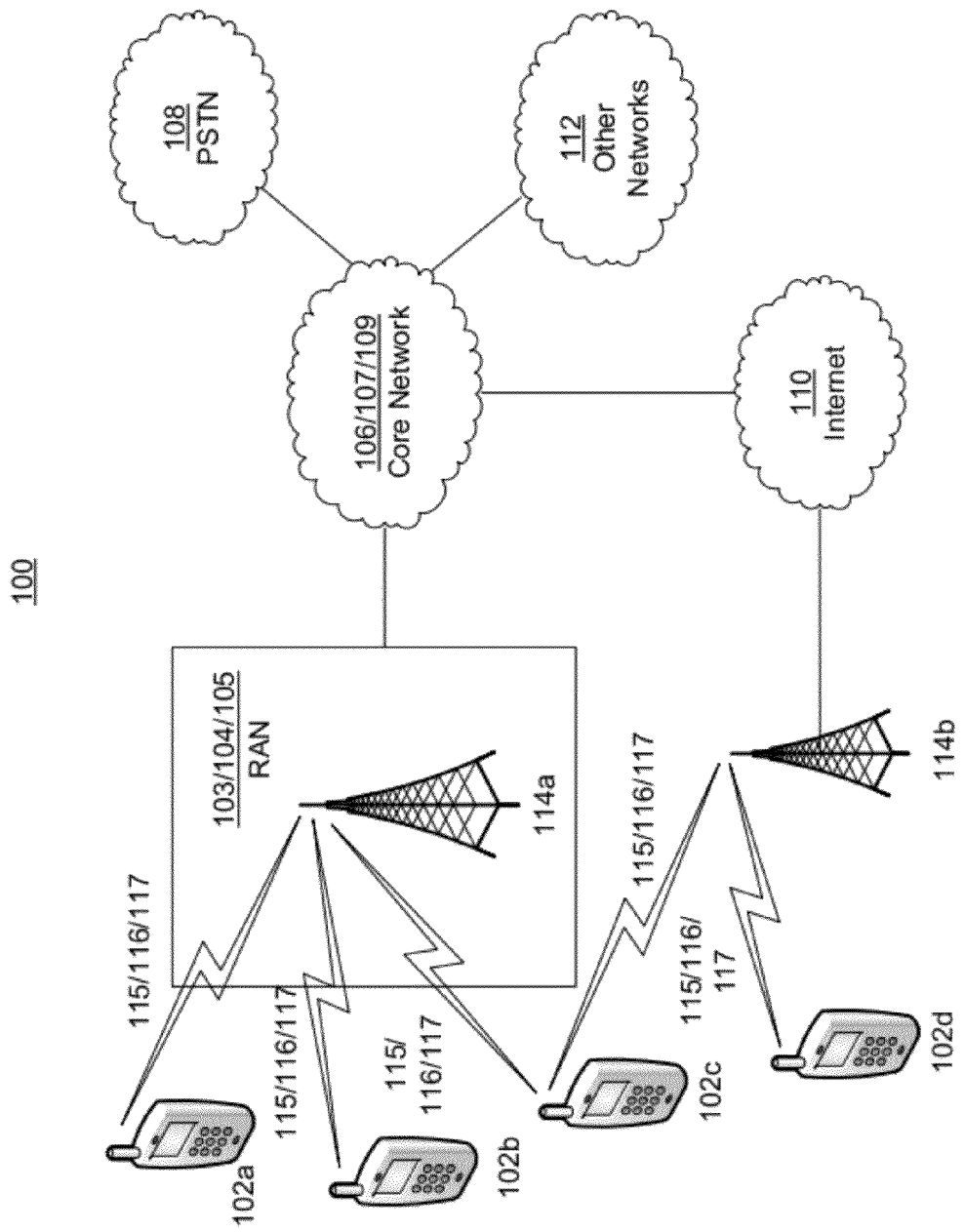
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
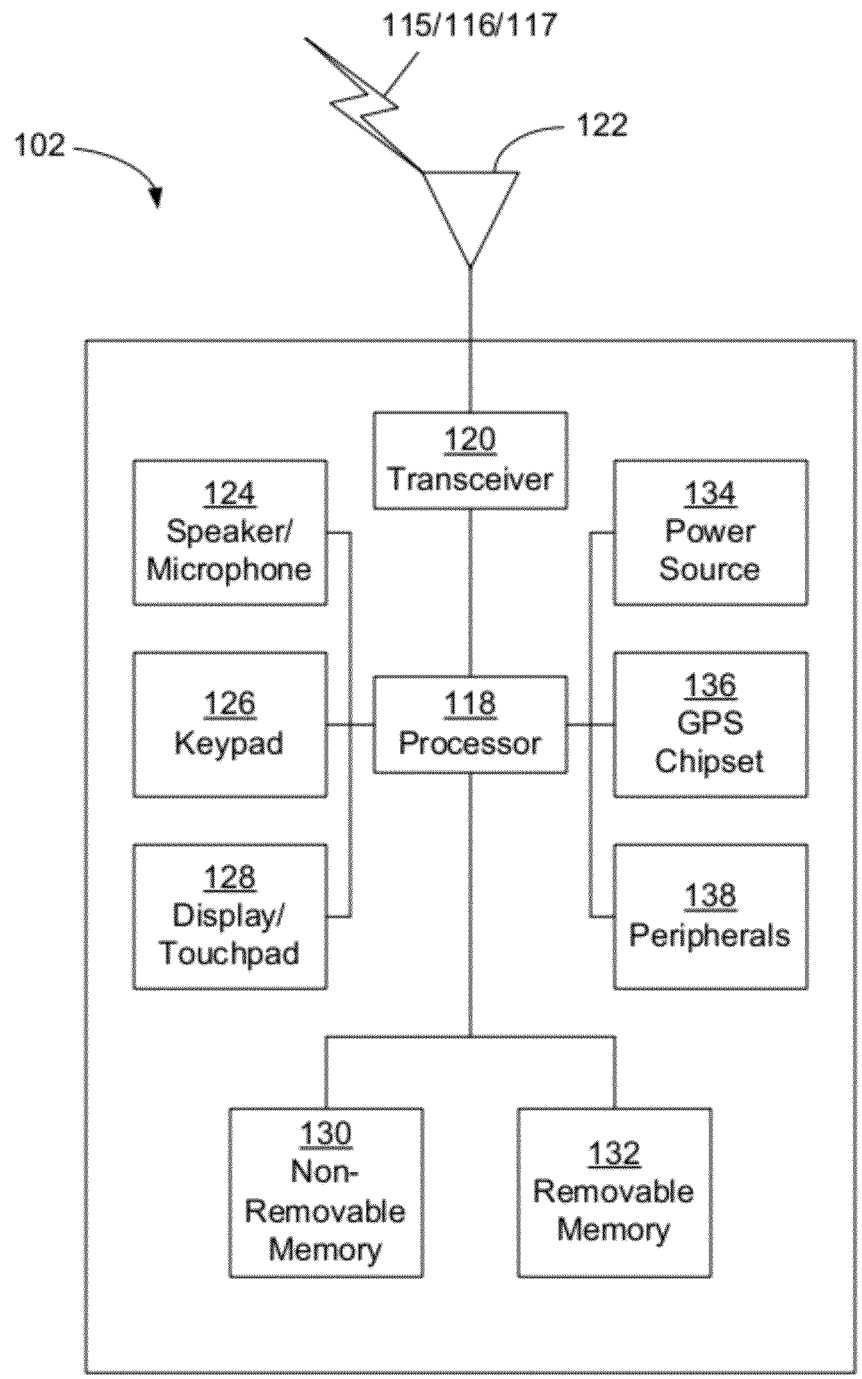
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
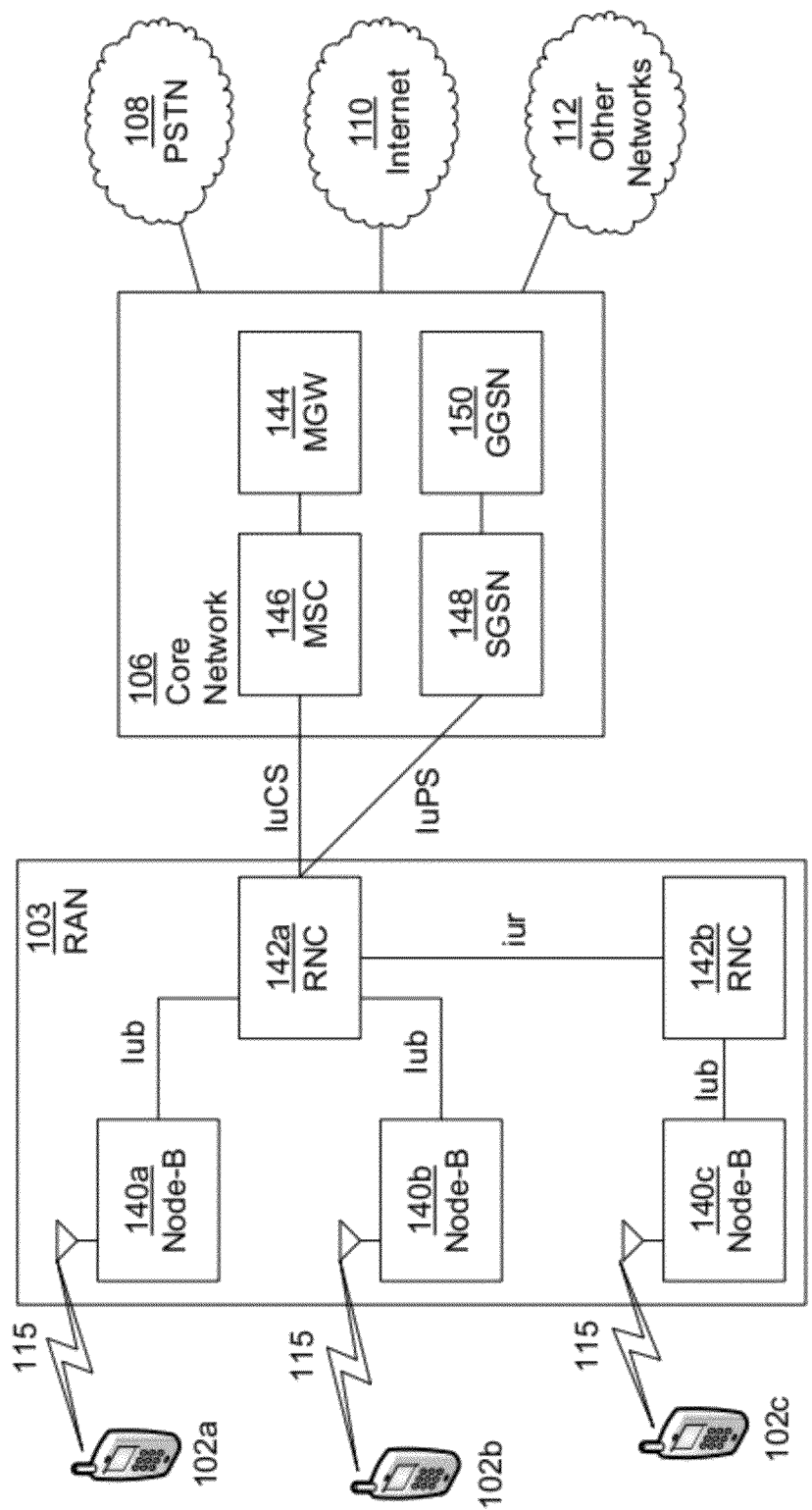
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, or 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
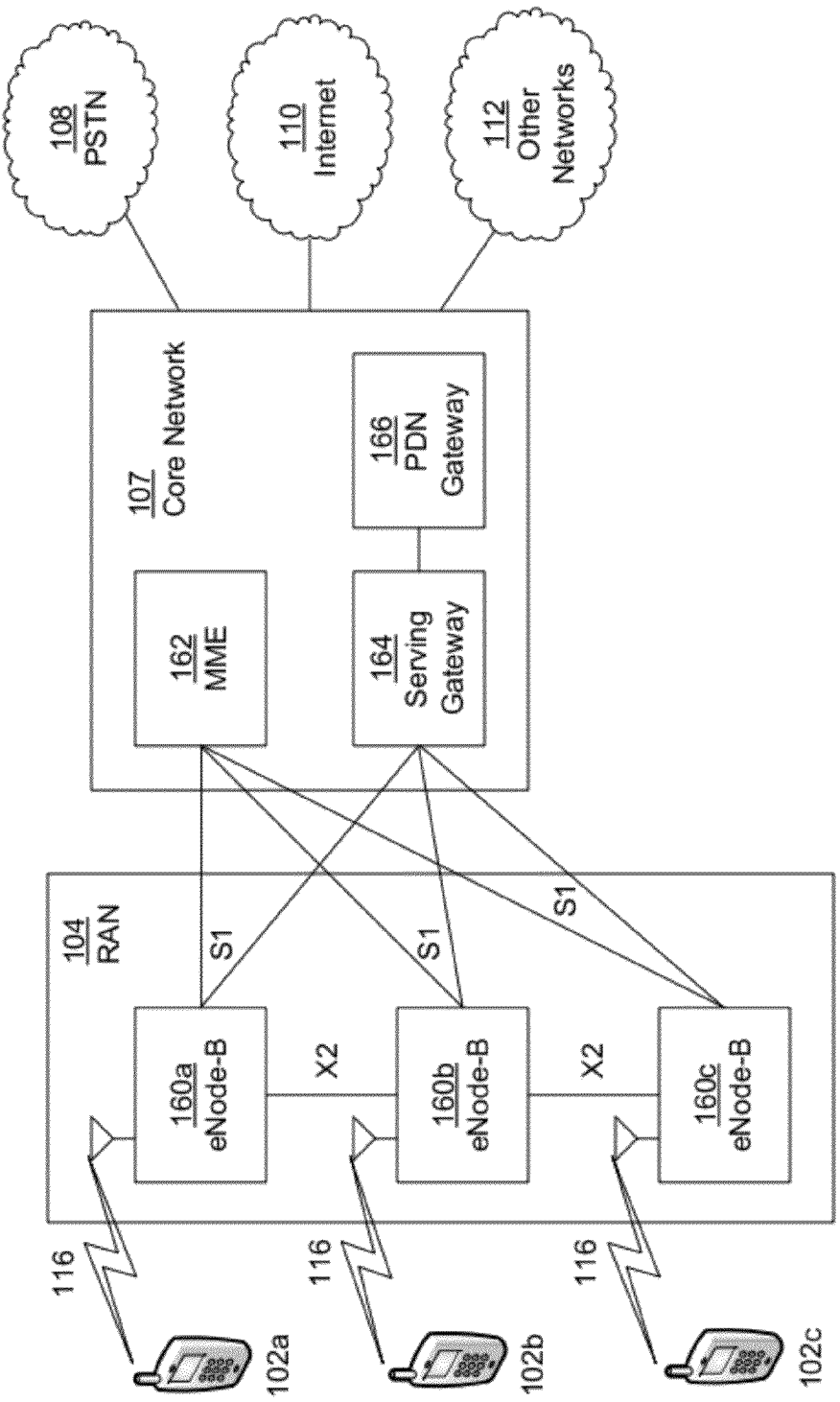
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
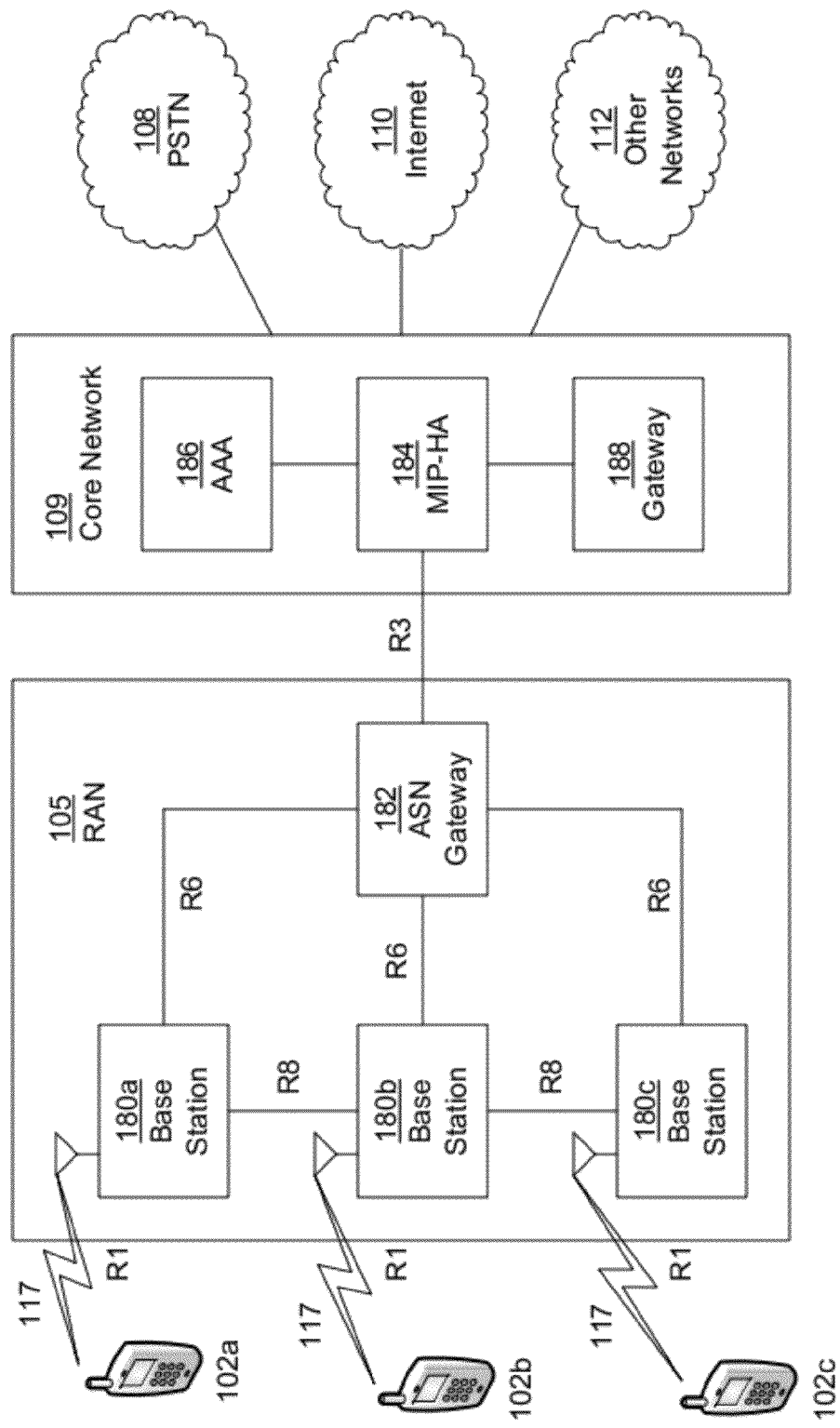
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Embodiments contemplate that a Berkeley Socket Application Program Interface (API) may be used in UNIX operating system as network API for application developers to develop network applications, for example. Embodiments contemplate that the Socket API may be recognized by numerous operating systems and may be understood to be a de facto standard of the Transmission Control Protocol/Internet Protocol (TCP/IP) APIs. Embodiments also contemplate that the Socket API may be extended to support evolution and/or support of IPv6, Mobile IPv6, and others, for example.

Embodiments contemplate Socket API extensions for devices that may have multiple interfaces/connections. By way of example, and not limitation, embodiments contemplate:

Physical interface/connection status (or state) acquiring API: it can return the type of physical interfaces and the number of connections that the host may have;

Connection mapping API: it may provide the mapping between the connection and the physical interface;

Connection status (or state) query API: By invoking this API, the application can monitor the status (or state) of the physical connections and may be advertised if the physical connection's status (or state) has changed; and/or Socket and Generic Connection bind API: this may allow binding to the Socket structure to the GenericConnection.

Embodiments contemplate that the transport layer may provide services such as connection-oriented data stream support, reliability, flow control, and/or multiplexing, for example. Embodiments recognize transport protocols such as the Transmission Control Protocol (TCP), the Datagram Congestion Control Protocol (DCCP), and the Stream Control Transmission Protocol (SCTP).

For a multi-interfaces device, embodiments contemplate that the Transport Layer may add the capability of using simultaneously multiple transport paths for a single application connection. This may allow increasing the bandwidth with an efficient usage of the multiples interfaces, and perhaps a most efficient usage of the multiple interfaces. Embodiments refer to this generic multi-connection transport protocol as MCTP.

Figure 2:
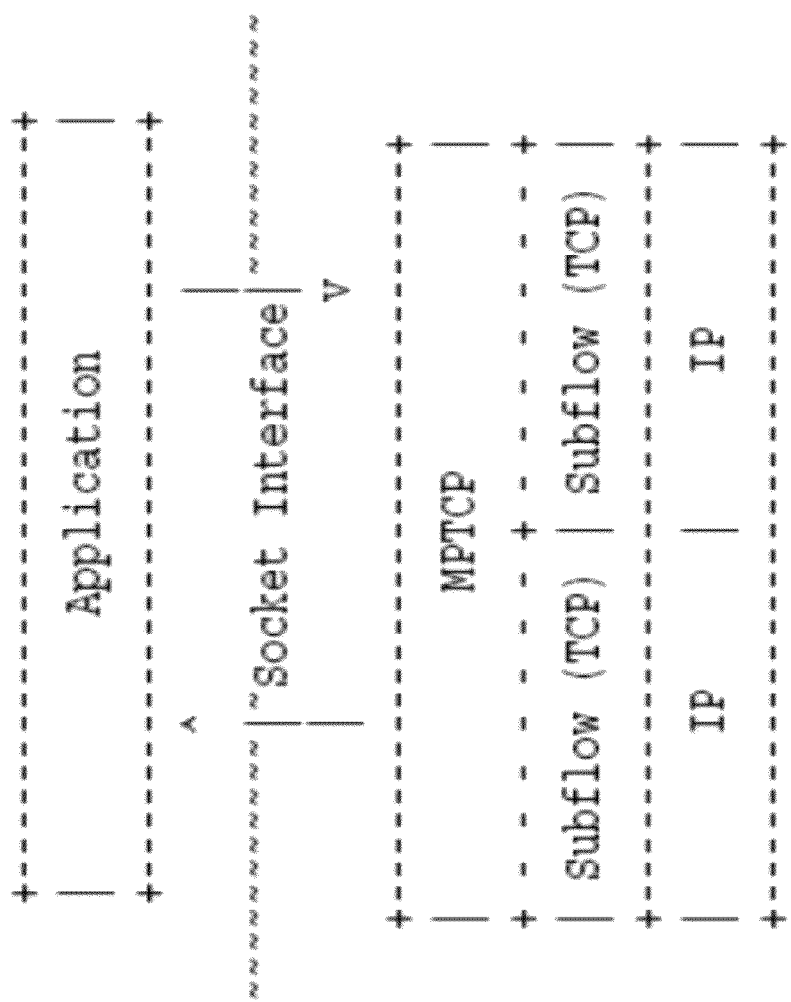
FIG. 2 is a diagram of an exemplary MPTCP protocol stack consistent with embodiments.
Figure 3:
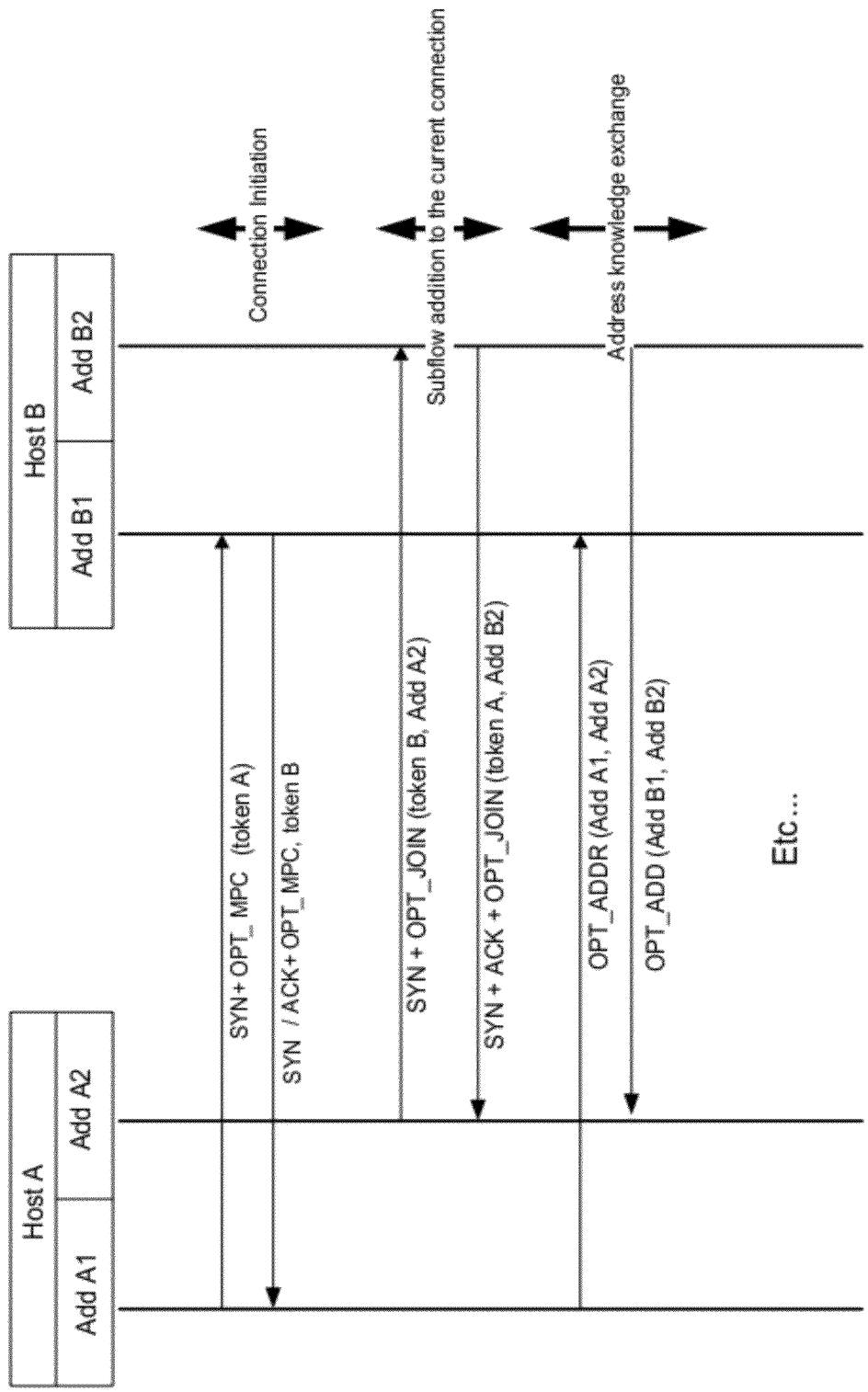
FIG. 3 is a message flow diagram of exemplary TCP extensions for creating an MPTCP connection consistent with embodiments.

Embodiments contemplate mechanisms that may add the capability of simultaneously using multiple paths to a regular TCP session. FIG. 2 sets forth a diagram of an exemplary MPTCP protocol stack. Embodiments recognize TCP Extensions that may support the MPTCP Connection Initiation, Addition and/or removal of sub-flows and mechanism which may allow the peers to share their own IP Addresses. FIG. 3 sets forth an exemplary message flow diagram of the TCP extensions for creating an MPTCP connection.

Embodiments contemplate that many computing devices may have multiple interfaces/connections and that it may be useful for applications to use the multiple interfaces/connection capabilities of these devices. Embodiments contemplate techniques for allowing the improved use of such device capabilities.

As described herein, MCTP may support features such as creating a new MCTP connection between both endpoints, adding a subflow to the connection, removing a subflow or sharing IP addresses available to create additional subflows. Therefore, each endpoint MCTP may need to know, perhaps at the (MC)TCP level, which local IP addresses are available.

Figure 4:
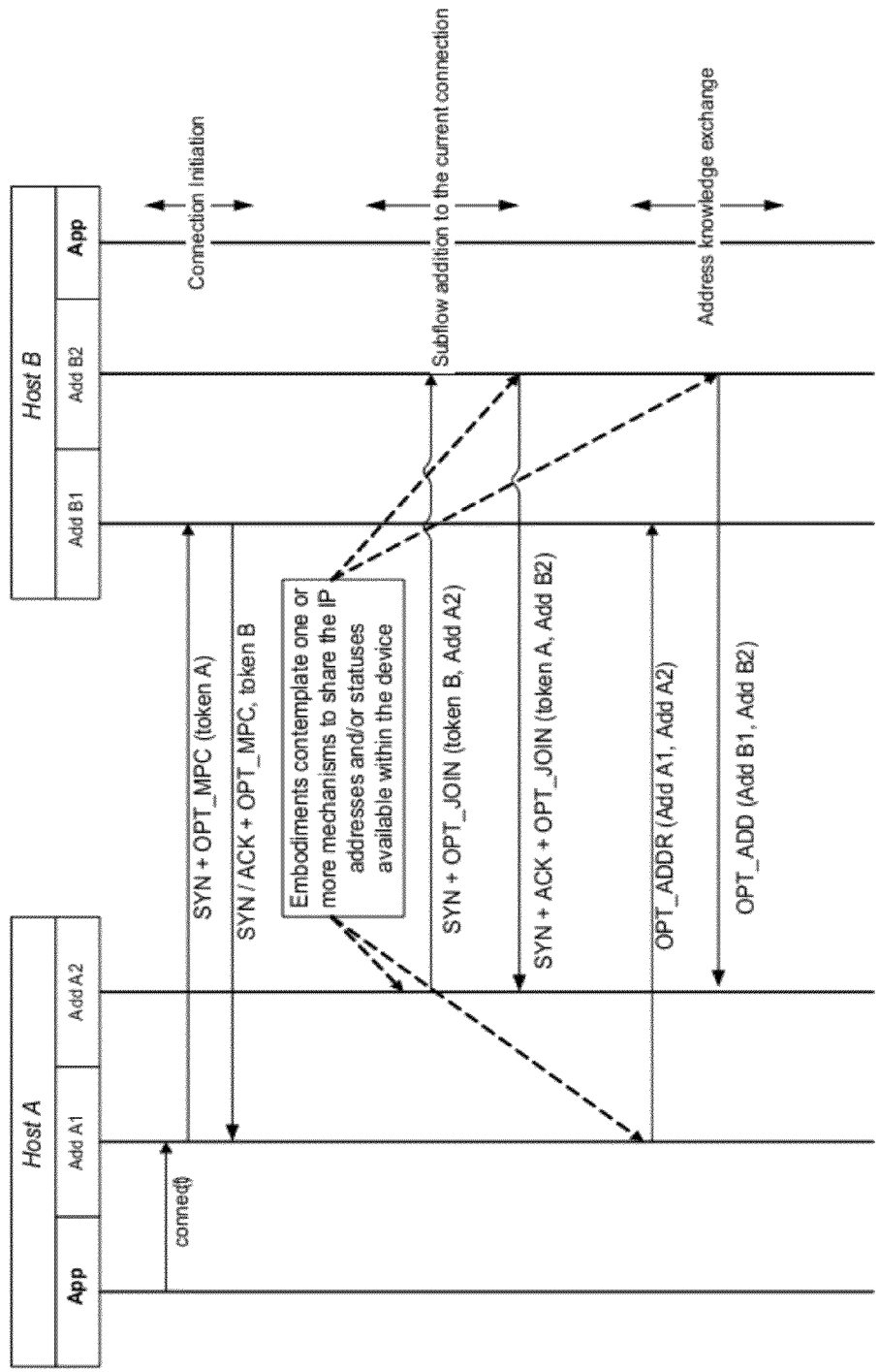
FIG. 4 is a message flow diagram of exemplary local IP address sharing according to an embodiment consistent with embodiments.

FIG. 4 illustrates an exemplary message flow diagram of local IP address sharing. It may be assumed that MCTP may have access to this information and may not provide a way to make the MCTP aware that a new IP address may be available in case a new interface is turned on, for example, absent contemplated improvements. Additionally, embodiments also contemplate that it may be useful for MCTP to know when an IP address may become unavailable, perhaps so that appropriate action may be taken in advance, such as relocating data traffic over a new subflow, for example. Also, embodiments contemplate that additional information such as Quality of Service (QoS) and/or bandwidth availability, for example, may be made available to MCTP to further improve decisions. Embodiments contemplate that, perhaps as a result of this information exchange, the MCTP protocol may decide to use a subset of the available IP addresses to establish the different connections.

One or more embodiments contemplate techniques that may allow the dynamic updating of IP addresses available within a device. Embodiments contemplate a socket API function and/or an IP service to which the MCTP can subscribe. Embodiments also contemplate that the disclosed embodiments may be used, for example, by an Advanced Connection Manager, a Media Independent Handover (MIH) User, or a Local Virtual Interface, among others, for allowing the Multi Connection Transport Protocol to perform its actions. Additionally, embodiments contemplate that parameters may added to some or each IP address that may provide a differentiation between the different IP addresses available. The added parameters may allow the Multi Connection Transport Protocol to make improved decisions.

Herein, the terms "multi-interface device" or "multihomed device" may be considered to have the same meaning and may be used interchangeably.

Figure 5:
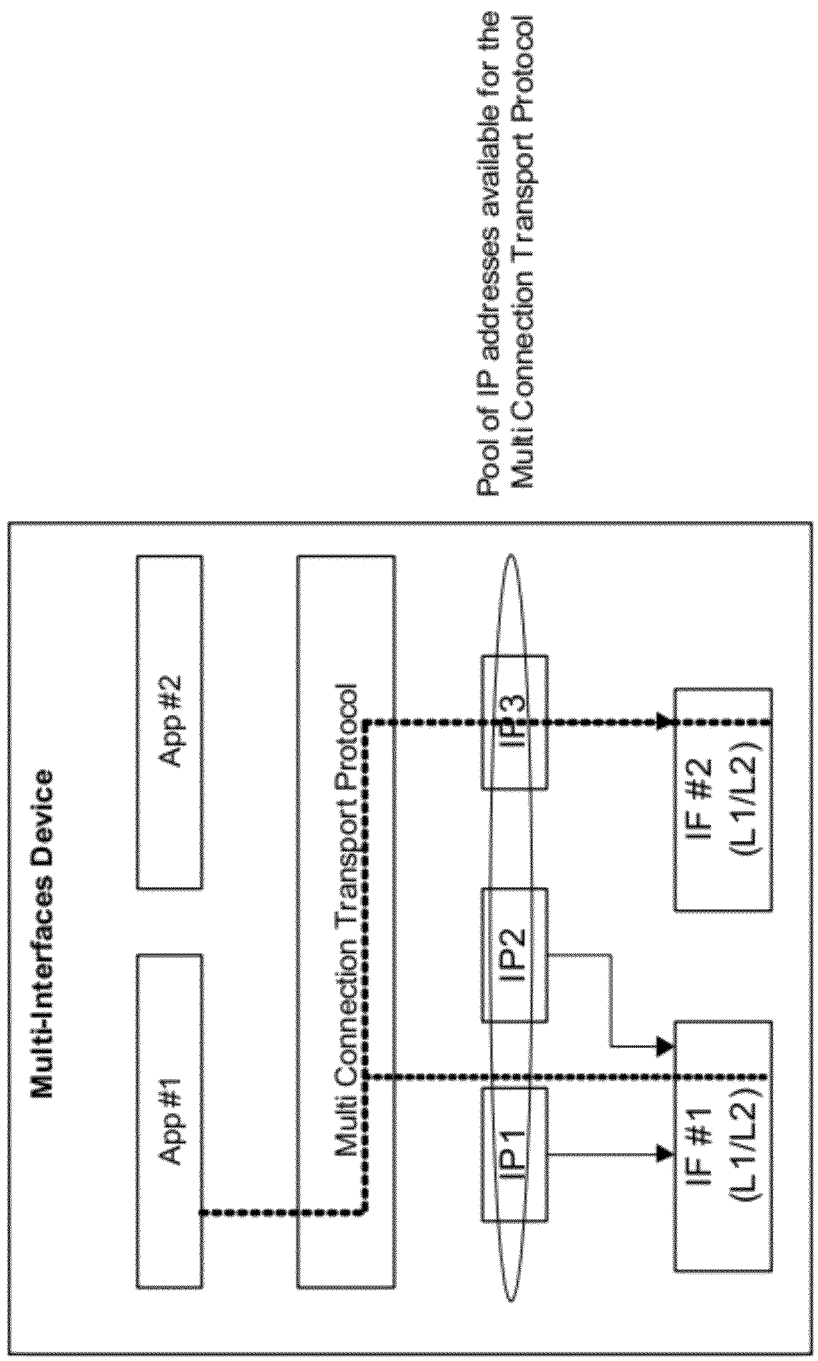
FIG. 5 illustrates an exemplary multi-interface device layered architecture consistent with embodiments.

FIG. 5 illustrates an exemplary multi-interfaces device layered architecture contemplated by embodiments. Referring to FIG. 5, the Application may reside on top of the Transport Protocol and may interface with the Transport Protocol through Internet sockets API. Embodiments contemplate that Internet sockets may be provided by the operating system and may constitute a mechanism for delivering incoming data packets to the appropriate application process or thread, perhaps based on a combination of local and/or remote IP addresses and port numbers. Embodiments contemplate that some or each socket may be mapped by the operating system to a communicating application process or thread.

In case of a multi-interface device, the local IP addresses may not be single and the number may vary based on the interfaces running (or not). Embodiments contemplate that the Interface Management may be handled by lower layer entity and may remain transparent to the Multi Connection Transport Layer.

Embodiments contemplate one or more interfaces that may allow one or more lower layer entities to manage the interfaces and retrieve the related IP addresses (e.g., IP stack, Virtual Interface, Connection Manager, and the like) to update the Multi Connection Transport Protocol with the new (or updated) state of the IP addresses pool available. Embodiments contemplate that one or more interfaces can be done either through a socket API function, a function call, a callback function, or the like. The one or more interface may provide the list of IP Addresses available, provides the status (or state) of a requested IP Addresses (i.e. available, not available, soon-to-be down, etc.), for example.

Embodiments recognize that the Transport Protocol may use the IP Address available with no specific distinction between them, except for the "Default IP Address" which should be used by default.

In the case of a multi-interface device, embodiments contemplate that the Multi Connection Transport Protocol may have little or no knowledge about the characteristics related to a specific IP address, absent contemplated improvements. These characteristics can be, for example, the related security (e.g., is it a VPN address or not), the ranking (e.g. this parameter can be stated by the Connection Manager which may prioritized the WiFi to the 3G for example), the related QoS (bandwidth availability, Round Trip Time (RTT), among others), and/or the interface type to which the IP may be associated. Embodiments contemplate that a weight can also be associated to the IP address, providing a policy based preference, for example. Embodiments recognize that these characteristics may be used by the Multi Connection Transport Protocol to optimize its own decision.

Figure 6:
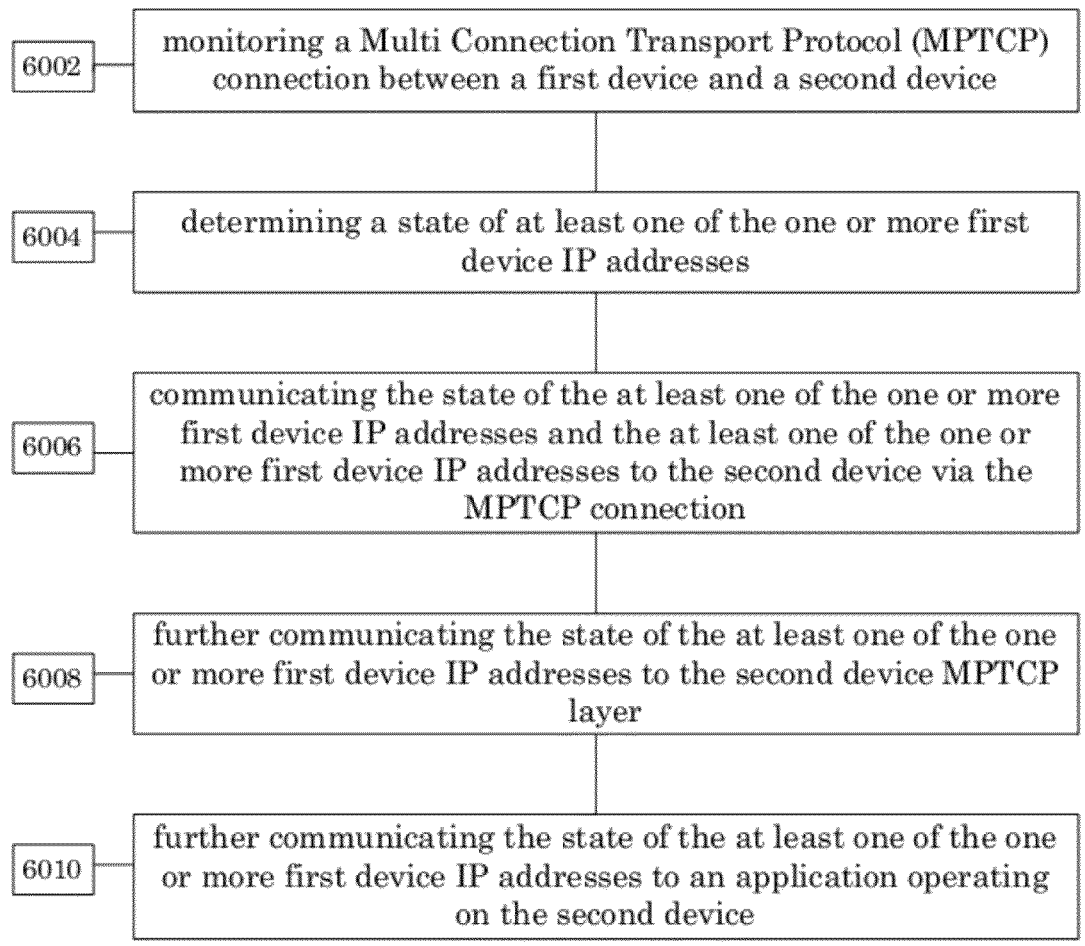
FIG. 6 illustrates a flowchart of an exemplary technique consistent with embodiments.

In light of the aforementioned disclosure, and referring to FIG. 6, embodiments contemplate, at 6002, monitoring a Multi Connection Transport Protocol (MPTCP) connection between a first device and a second device. Embodiments contemplate that the first device and the second device may have a respective MPTCP layer. Embodiments also contemplate that the first device may be associated with one or more Internet Protocol (IP) addresses. Embodiments contemplate, at 6004, determining a state of at least one of the one or more first device IP addresses. Embodiments further contemplate, at 6006, communicating the state of the at least one of the one or more first device IP addresses and the at least one of the one or more first device IP addresses to the second device via the MPTCP connection.

Alternatively or additionally, embodiments contemplate, at 6008, that the state of the at least one of the one or more first device IP addresses is further communicated to the second device MPTCP layer. Alternatively or additionally, embodiments contemplate, at 6010, that the state of the at least one of the one or more first device IP addresses is further communicated to an application operating on the second device.

Figure 6A:
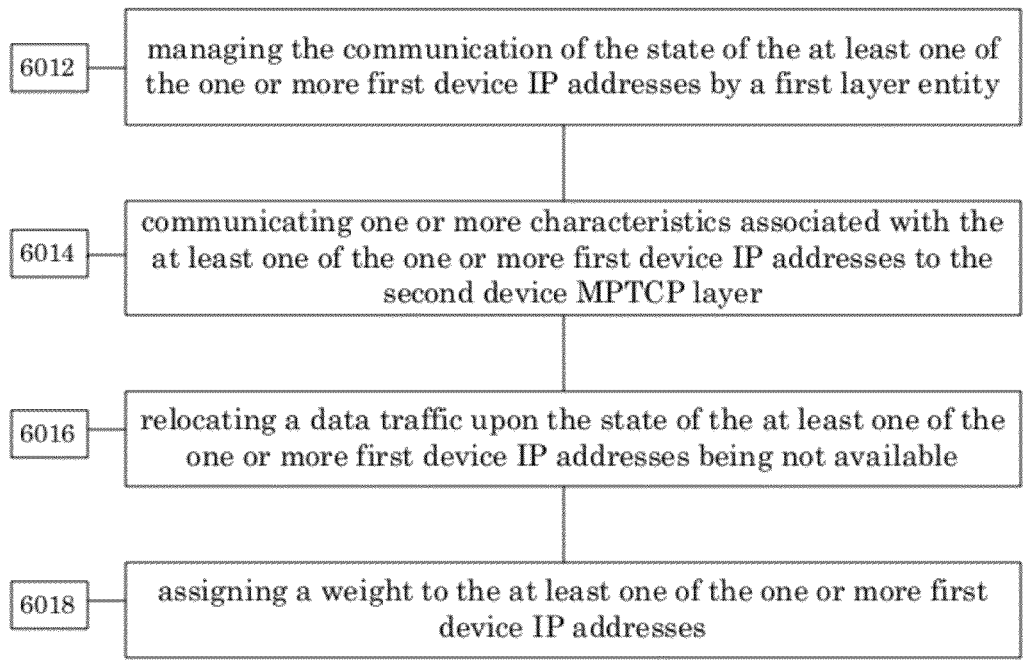
FIG. 6A illustrates a flowchart of another exemplary technique consistent with embodiments.

Referring to FIG. 6A, alternatively or additionally, embodiments contemplate, at 6012, that the communication of the state of the at least one of the one or more first device IP addresses may be managed by a first layer entity. Embodiments contemplate that he first layer entity may be below the MPTCP layer of the first device and the second device. Embodiments contemplate that the management that may be provided by the first layer entity may be transparent to the MPTCP layer. Embodiments also contemplate that the first layer entity may be at least one of an IP stack, a virtual interface, or a connection manager.

Alternatively or additionally, embodiments contemplate that the state of the at least one of the one or more first device IP addresses may be communicated via at least one of a socket application program interface (API) function, a function call, or a callback function.

Alternatively or additionally, embodiments contemplate, at 6014, communicating one or more characteristics associated with the at least one of the one or more first device IP addresses to the second device MPTCP layer. Embodiments contemplate that the one or more characteristics may include at least one of security information, a bandwidth availability, a ranking, a Quality of Service, or an interface type.

Embodiments contemplate that the state of the at least one of the one or more first device IP addresses may be at least one of available, not available, or soon-to-be down. Alternatively or additionally, embodiments contemplate, at 6016, relocating a data traffic upon the state of the at least one of the one or more first device IP addresses being not available. Alternatively or additionally, embodiments contemplate, at 6018, assigning a weight to the at least one of the one or more first device IP addresses.

Figure 7:
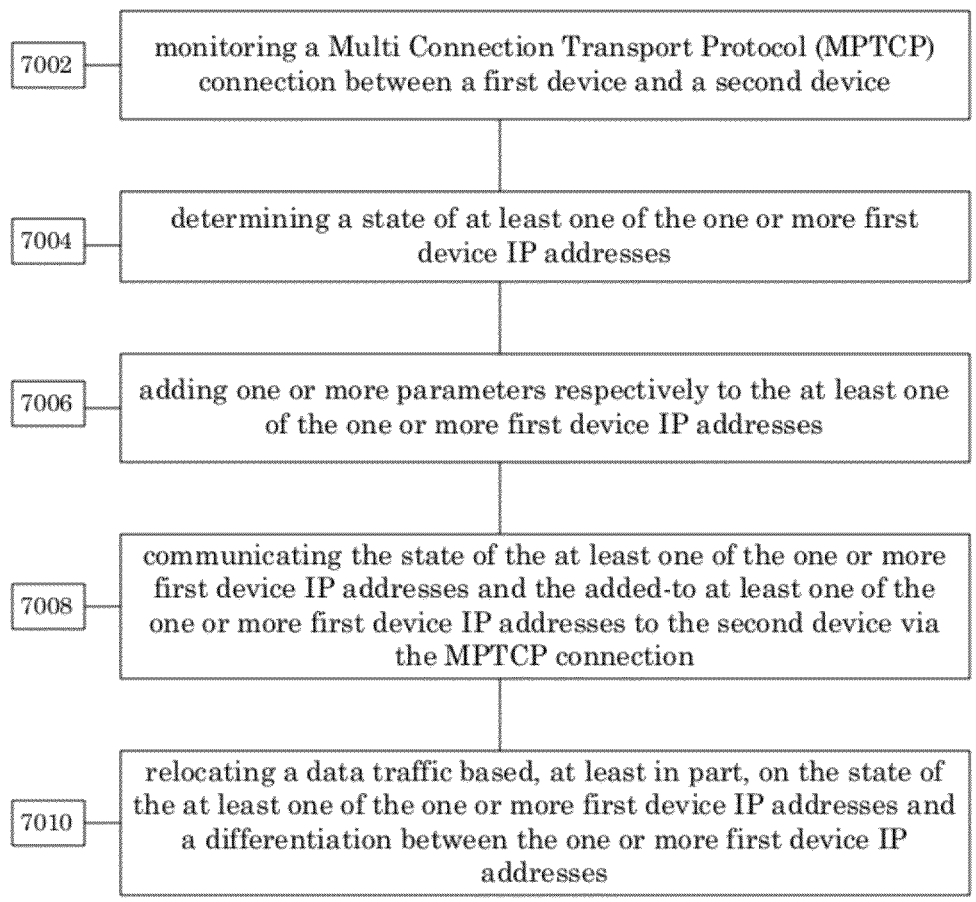
FIG. 7 illustrates a flowchart of another exemplary technique consistent with embodiments.

Referring to FIG. 7, alternatively or additionally, embodiments contemplate, at 7002, monitoring a Multi Connection Transport Protocol (MPTCP) connection between a first device and a second device. Embodiments contemplate that the first device and the second device may have a respective MPTCP layer. Embodiments also contemplate that the first device may be associated with one or more Internet Protocol (IP) addresses. Embodiments further contemplate, at 7004, determining a state of at least one of the one or more first device IP addresses. At 7006, embodiments contemplate adding one or more parameters respectively to the at least one of the one or more first device IP addresses. Also, embodiments contemplate, at 7008, communicating the state of the at least one of the one or more first device IP addresses and the added-to at least one of the one or more first device IP addresses to the second device via the MPTCP connection.

Alternatively or additionally, embodiments contemplate that the added one or more parameters may provide a differentiation between the one or more first device IP addresses. Alternatively or additionally, embodiments contemplate, at 7010, relocating a data traffic based, at least in part, on the state of the at least one of the one or more first device IP addresses and the differentiation between the one or more first device IP addresses.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, comprising:
monitoring a Multi Connection Transport Protocol (MPTCP) connection between a first device and a second device, the first device and the second device having a respective MPTCP layer, and the first device being associated with one or more Internet Protocol (IP) addresses;
determining a state of at least one of the one or more first device IP addresses; and
communicating the state of the at least one of the one or more first device IP addresses and the at least one of the one or more first device IP addresses to the second device via the MPTCP connection, the communicating the state of the at least one of the one or more first device IP addresses being managed by a layer entity, the layer entity being below the MPTCP layer of the first device and the second device, and the management being transparent to the MPTCP layer.

2. The method of claim 1, wherein the state of the at least one of the one or more first device IP addresses is further communicated to the second device MPTCP layer.

3. The method of claim 1, wherein the state of the at least one of the one or more first device IP addresses is further communicated to an application operating on the second device.

4. The method of claim 1, wherein the layer entity is at least one of an IP stack, a virtual interface, or a connection manager.

5. The method of claim 1, wherein the state of the at least one of the one or more first device IP addresses is communicated via at least one of a socket application program interface (API) function, a function call, or a callback function.

6. The method of claim 1, further including communicating one or more characteristics associated with the at least one of the one or more first device IP addresses to the second device MPTCP layer.

7. The method of claim 1, wherein the one or more characteristics include at least one of security information, a bandwidth availability, a ranking, a Quality of Service, or an interface type.

8. The method of claim 1, wherein the state of the at least one of the one or more first device IP addresses is at least one of available, not available, or soon-to-be down.

9. The method of claim 8, further including relocating a data traffic upon the state of the at least one of the one or more first device IP addresses being not available.

10. The method of claim 1, further including assigning a weight to the at least one of the one or more first device IP addresses.

11. A wireless transmit/receive unit (WTRU) configured to communicate internet protocol (IP) information, comprising:
a processor, the processor configured, at least in part, to:
monitor a Multi Connection Transport Protocol (MPTCP) connection between the WTRU and a second device, the WTRU and the second device having a respective MPTCP layer, and the WTRU being associated with one or more Internet Protocol (IP) addresses;
determine a state of at least one of the one or more WTRU IP addresses; and
initiate the communication of the state of the at least one of the one or more WTRU IP addresses and the at least one of the one or more WTRU IP addresses to the second device via the MPTCP connection, the communication of the state of the at least one of the one or more WTRU IP addresses being managed by a layer entity, the layer entity being below the MPTCP layer of the WTRU and the second device, and the management being transparent to the MPTCP layer.

12. The WTRU of claim 11, wherein the state of the at least one of the one or more WTRU IP addresses is communicated via at least one of a socket application program interface (API) function, a function call, or a callback function.

13. The WTRUI of claim 11, wherein the processor is further configured to initiate the communication of one or more characteristics associated with the at least one of the one or more WTRU IP addresses to the second device MPTCP layer.

14. The WTRU of claim 13, wherein the one or more characteristics include at least one of security information, a bandwidth availability, a ranking, a Quality of Service, or an interface type.

15. The WTRU of claim 11, wherein the processor is further configured to initiate the communication of the state of the at least one of the one or more WTRU IP addresses to an application operating on the second device.

16. A method, comprising:
monitoring a Multi Connection Transport Protocol (MPTCP) connection between a first device and a second device, the first device and the second device having a respective MPTCP layer, and the first device being associated with one or more Internet Protocol (IP) addresses;
determining a state of at least one of the one or more first device IP addresses;
adding one or more parameters respectively to the at least one of the one or more first device IP addresses; and
communicating the state of the at least one of the one or more first device IP addresses and the added-to at least one of the one or more first device IP addresses to the second device via the MPTCP connection, the communicating the state of the at least one of the one or more first device IP addresses being managed by a layer entity, the layer entity being below the MPTCP layer of the first device and the second device, and the management being transparent to the MPTCP layer.

17. The method of claim 16, wherein the added one or more parameters provide a differentiation between the one or more first device IP addresses.

18. The method of claim 17, including relocating a data traffic based, at least in part, on the state of the at least one of the one or more first device IP addresses and the differentiation between the one or more first device IP addresses.

* * * * *